United States Patent
Wong et al.

(10) Patent No.: US 7,769,882 B1
(45) Date of Patent: Aug. 3, 2010

(54) BANDWIDTH PROJECTION FOR CUSTOMER BANDWIDTH USAGE

(75) Inventors: Kanglung Wong, Overland Park, KS (US); Amy L. Welsh, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 490 days.

(21) Appl. No.: 11/689,701

(22) Filed: Mar. 22, 2007

(51) Int. Cl.
*G06F 15/16* (2006.01)
*H04J 3/16* (2006.01)

(52) U.S. Cl. ...................... 709/232; 370/468
(58) Field of Classification Search ................ 709/224, 709/223, 233, 232; 370/468, 235, 395.41; 725/81; 703/22
See application file for complete search history.

(56) References Cited

U.S. PATENT DOCUMENTS

| | | | |
|---|---|---|---|
| 6,848,004 B1* | 1/2005 | Chang et al. ............... 709/232 |
| 7,206,285 B2* | 4/2007 | Loguinov ................... 370/235 |
| 7,391,780 B1* | 6/2008 | Stone et al. ............ 370/395.41 |
| 7,477,659 B1* | 1/2009 | Nee et al. .................... 370/468 |
| 2002/0172222 A1* | 11/2002 | Ullmann et al. ............. 370/468 |
| 2005/0097217 A1* | 5/2005 | Val et al. .................... 709/233 |
| 2006/0020694 A1* | 1/2006 | Nag et al. ................... 709/223 |
| 2006/0095944 A1* | 5/2006 | Demircin et al. .............. 725/81 |
| 2006/0190236 A1* | 8/2006 | Malloy et al. ................. 703/22 |
| 2007/0192482 A1* | 8/2007 | Smith et al. ................. 709/224 |
| 2007/0217448 A1* | 9/2007 | Luo et al. ................... 370/468 |
| 2009/0070454 A1* | 3/2009 | McKinnon et al. .......... 709/224 |

* cited by examiner

*Primary Examiner*—Jungwon Chang

(57) ABSTRACT

A method of operating a bandwidth projection system comprises receiving a historical dataset associated with a customer wherein the historical dataset indicates bandwidth usage during a historical time period, processing the historical dataset with a plurality of model applications to generate a plurality of bandwidth models based on the historical dataset, selecting a one model from the plurality of models based on a comparison to the historical dataset, generating a bandwidth projection using the one model wherein the bandwidth projection indicates a bandwidth usage during a future time period, and transferring the bandwidth projection to the customer.

26 Claims, 6 Drawing Sheets

BANDWIDTH PROJECTION FOR CUSTOMER BANDWIDTH USAGE

BACKGROUND OF THE INVENTION

1. Field of the Invention

The invention relates to communications, and in particular, to projecting bandwidth for customer bandwidth usage.

2. Description of the Prior Art

Communication service providers provide communication services to customers over communication links, such as wireless, T-1, and Internet links. Communication links should be sized with the appropriate capacity to handle customer traffic. Bandwidth is a measure of communications capacity over a communication link.

In many cases, service providers enter into service contracts with customers that require the service providers to provide the customers with guaranteed minimum amounts of bandwidth during future time periods. Bandwidth projections are used to determine the minimum amounts of bandwidth. Communication service providers utilize bandwidth models to project the future bandwidth needs of their customers. To make future projections, communication service providers use a model application to generate a bandwidth model based on a historical dataset. The bandwidth model is used to create the future projection. For example, a service provider may use a linear projection to size a T-1 communication link based on erlang data.

When the minimum amount of bandwidth specified by a bandwidth projection is less than an actual bandwidth need, the service provider may not provide enough bandwidth to the customer. When the minimum amount of bandwidth specified by a bandwidth projection is greater than the actual bandwidth need, the service provider may waste bandwidth. It is therefore important for bandwidth projections to track actual bandwidth needs as closely as possible.

FIG. 1 illustrates a graph of a historical dataset. Flaws in the historical datasets can produce inaccurate projections. The vertical axis of the graph in FIG. 1 indicates bandwidth usage. The horizontal axis of the graph indicates a twelve month period. FIG. 1 illustrates the historical data set as points on the graph. The historical dataset includes discrete measurements of bandwidth used by a customer over the twelve month period.

As illustrated in FIG. 1, the historical data set includes missing data and outliers. The missing data and outliers are circled. Missing data is identified at month 3. Outliers are identified at months 6 and 10. A bandwidth projection based on the historical data set of FIG. 1 could be flawed or distorted due to the missing data and the outliers. For instance, the missing data could lower the bandwidth projection. The outliers could either increase or decrease the projection erroneously.

In another problem, linear models frequently do not closely resemble historical data sets and do not produce accurate bandwidth projections. In many cases, the relationship between bandwidth usage and time may not be linear. For example, the graph of bandwidth usage over time by a customer often times will not follow a straight line and may include many peaks and troughs that correspond to high and low bandwidth usage. However, the graph of a linear model is a straight line. The graph of a linear bandwidth projection will also be a straight line. The linear bandwidth projection will produce periods of time where the projection is too high and other periods of time where the projection is too low when compared to actual bandwidth usage.

FIG. 2 illustrates a graph of a linear model in an example of the prior art. As is well known in the art, a linear regression process could be executed on the historical dataset of FIG. 1 to generate the linear model. The graph in FIG. 2 also illustrates the historical dataset shown in FIG. 1. By comparing the graph of the linear model to the historical dataset, FIG. 2 shows how linear models do not accurately model actual bandwidth usage.

The vertical axis of the graph in FIG. 2 indicates bandwidth usage. The horizontal axis of the graph indicates a twelve month period. As illustrated in FIG. 2, the graph of the linear model is a straight line, whereas the graph of the historical dataset includes waves and troughs. During periods of high usage (months 2, 7, and 12, for example), the graph of the linear model is lower than the graph of the historical dataset. During periods of low usage (months 5 and 9, for example), the graph of the linear model is higher than the graph of the historical dataset.

If the linear model graphed in FIG. 2 were used to produce a bandwidth projection, the bandwidth projection would not accurately project future bandwidth usage. Rather, the bandwidth projection would be higher than the actual future bandwidth usage during some periods of time. The bandwidth projection would be lower than the actual future bandwidth usage during other periods of time.

Further problematically, linear bandwidth models are generated using only a single model application. Using only a single model application limits the resulting bandwidth models from which a best fit bandwidth model is selected.

SUMMARY OF THE INVENTION

In an embodiment of the invention, a method of operating a bandwidth projection system comprises receiving a historical dataset associated with a customer wherein the historical dataset indicates bandwidth usage during a historical time period, processing the historical dataset with a plurality of model applications to generate a plurality of bandwidth models based on the historical dataset, selecting a one model from the plurality of models based on a comparison to the historical dataset, generating a bandwidth projection using the one model wherein the bandwidth projection indicates a bandwidth usage during a future time period, and transferring the bandwidth projection to the customer.

In an embodiment of the invention, a description of the one model is transferred to the customer.

In an embodiment of the invention, a user instruction related to the one model is received, the user instruction being transferred from the customer in response to receiving the description of the one model.

In an embodiment of the invention, the user instruction is processed to generate a new bandwidth projection and the new bandwidth projection is transferred to the customer.

In an embodiment of the invention, an acceptance from the customer is received wherein the acceptance forms a service contract between a service provider and the customer for the new bandwidth projection during the future time period.

In an embodiment of the invention, the description of the one model includes a growth factor.

In an embodiment of the invention, the user instruction includes a different growth factor.

In an embodiment of the invention, the description of the one model includes a chronological factor.

In an embodiment of the invention, the user instruction includes a different chronological factor.

In an embodiment of the invention, the plurality of bandwidth models comprise non-linear bandwidth models.

In an embodiment of the invention, the one bandwidth model is selected based on a root mean square error formula.

In an embodiment of the invention, a first model application of the plurality of model applications comprises a Holt-Winters model application.

In an embodiment of the invention, a second model application of the plurality of model applications comprises an exponential model application.

In an embodiment of the invention, software product for operating a bandwidth projection system comprises software operational when executed by the bandwidth projection system to direct the bandwidth projection system to receive a historical dataset associated with a customer, wherein the historical dataset indicates bandwidth usage during a historical time period, process the historical dataset with a plurality of model applications to generate a plurality of bandwidth models based on the historical dataset, select a one model from the plurality of models on a comparison to the historical dataset, generate a bandwidth projection using the one model wherein the bandwidth projection indicates a bandwidth usage during a future time period, and transfer the bandwidth projection to the customer, and a storage medium configured to store the software.

BRIEF DESCRIPTION OF THE DRAWINGS

The same reference number represents the same element on all drawings.

DETAILED DESCRIPTION OF THE PREFERRED EMBODIMENT

FIGS. 3-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 3:
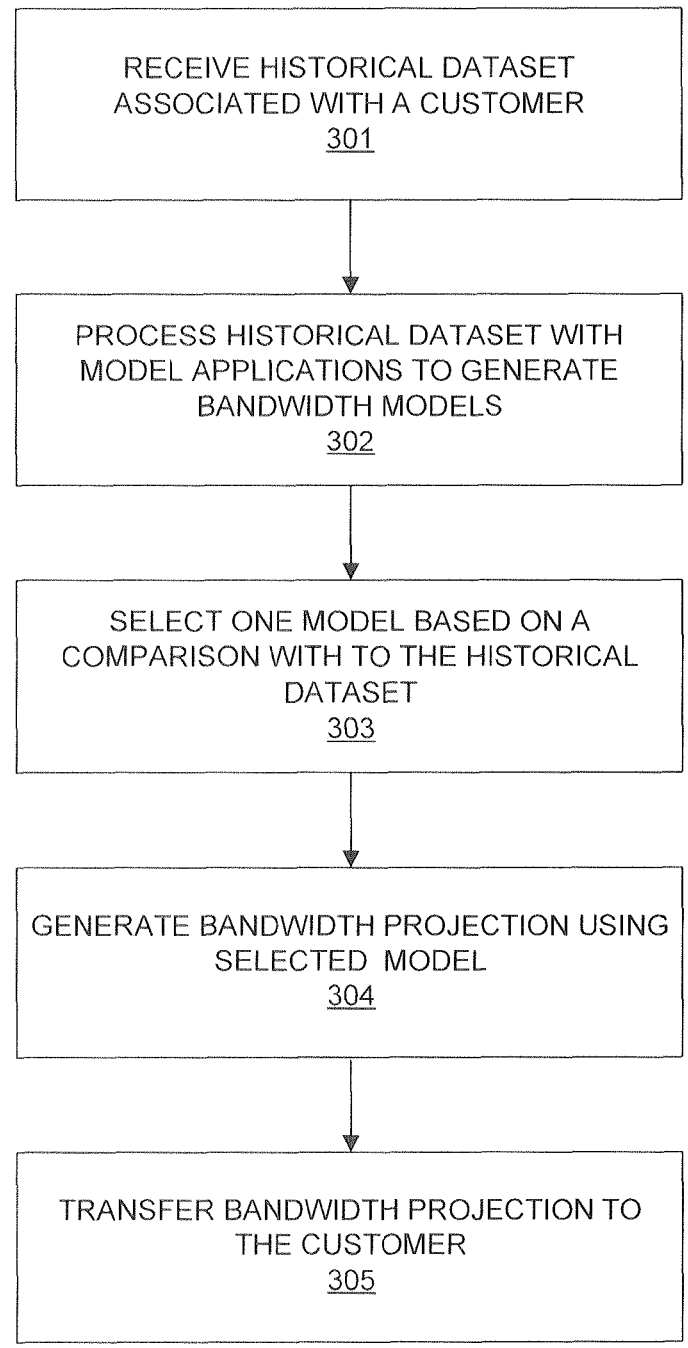
FIG. 3 illustrates a process in an embodiment of the invention.

FIG. 3 illustrates a process 300 in an embodiment of the invention. The process 300 could be employed by a bandwidth projection system to generate bandwidth projections.

Referring to FIG. 3, the bandwidth projection system receives a historical dataset (Step 301). The historical dataset could be associated with a customer. The historical dataset indicates bandwidth usage by the customer during a historical time period.

Upon receiving the historical dataset, the bandwidth projection system processes the historical dataset with multiple model applications to generate multiple bandwidth models based on the historical dataset (Step 302). It should be understood that the multiple bandwidth models could be non-linear models.

Figure 1:
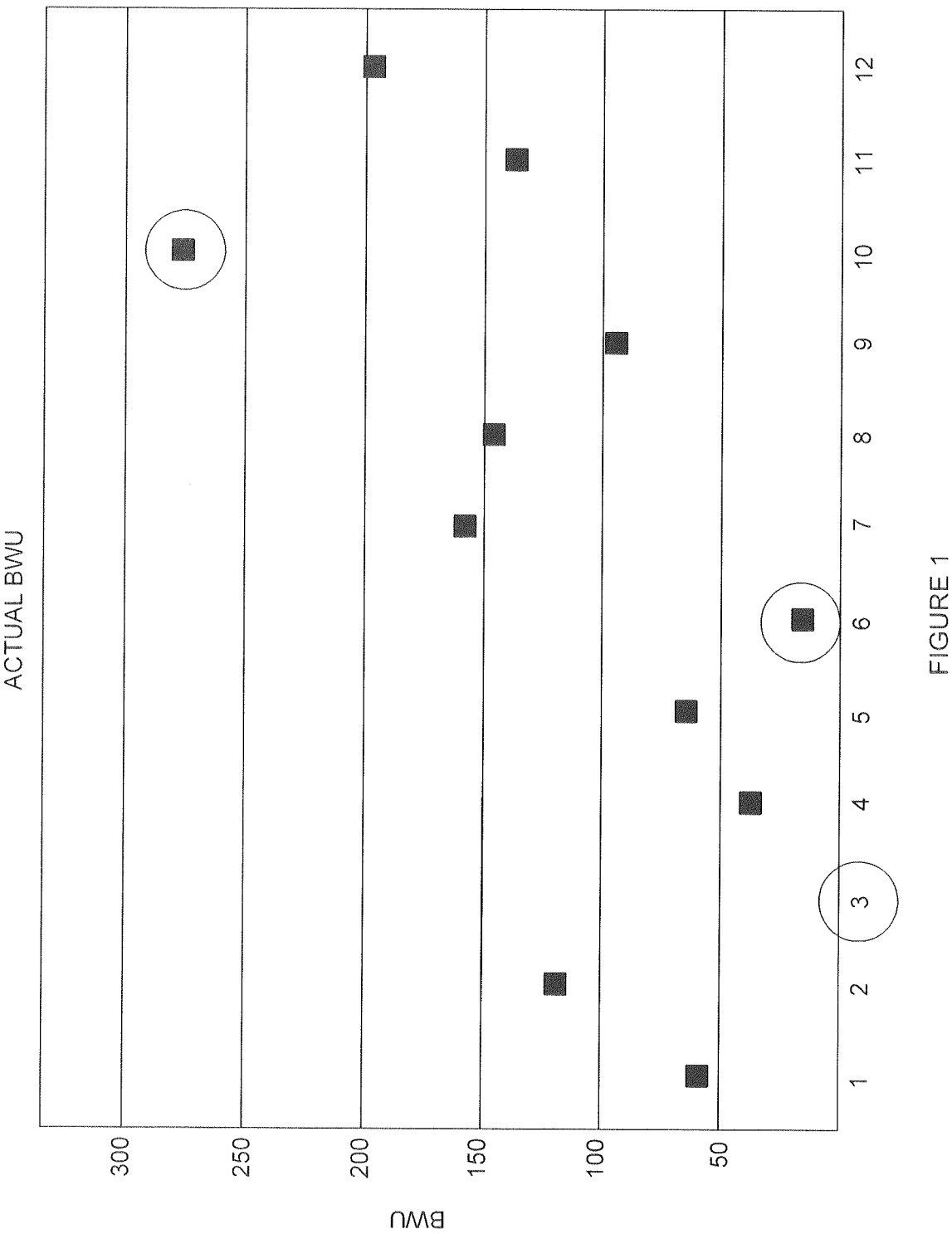
FIG. 1 illustrates a graph of a historical dataset.
Figure 2:
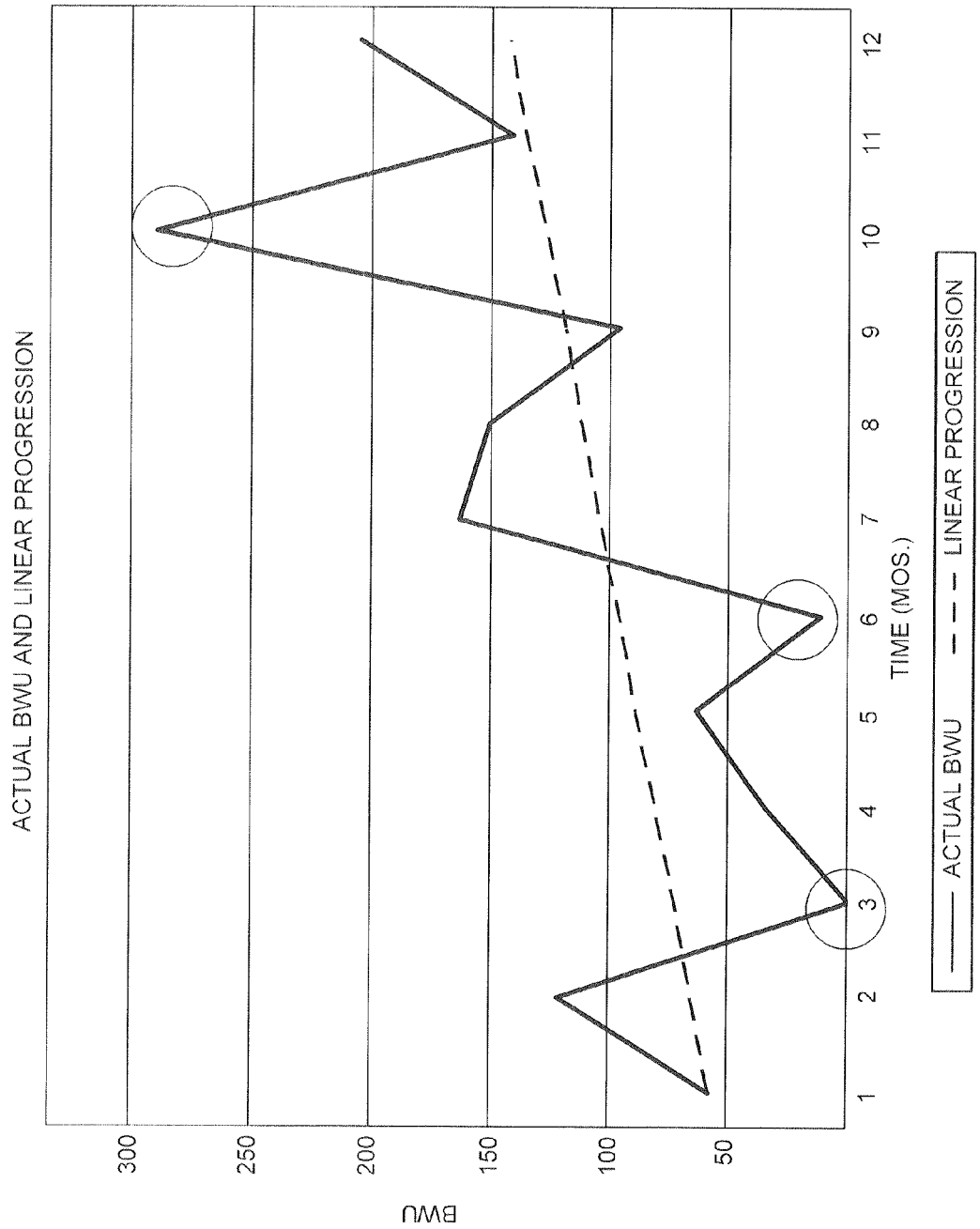
FIG. 2 illustrates a graph in an example of the prior art.

Processing the historical dataset could include cleaning the dataset, such as by rectifying missing data or outliers. For example, the missing data at 3 months in FIG. 1 could be replaced with new data. In another example, the outliers at 6 months and 12 months could be replaced with new data. For instance, the new data could be derived from the average of all data in the dataset or the average of nearby data.

Processing the historical dataset to generate the bandwidth models could also include processing various factors that influence the bandwidth models, such as growth, chronological, and seasonal factors. The model applications can weight the historical data set based on the various factors.

In an example of a chronological factor, more recent data could be given a greater weight than older data. If the more recent data is weighted more than the older data, the more recent data would have a greater impact on the generation of a bandwidth model by a model application. For instance, recent data in a dataset may indicate high bandwidth usage, whereas older data may indicate low bandwidth usage. If the recent data is weighted greater than the older data, a bandwidth model based on the dataset would emphasize the high bandwidth usage, rather than the low bandwidth usage. The high bandwidth usage would be incorporated into any future bandwidth projections generated by the bandwidth model.

In an example of a seasonal factor, certain periods of time could be given a greater weight than other time periods. For example, a dataset may indicate a bandwidth spike during a single month. By weighting the data for that particular month, a resulting bandwidth model generated using the dataset would accurately reflect the spike. Assuming the spike is a recurring phenomenon, a future bandwidth projection generated by the bandwidth model will incorporate the spike.

In an example of a growth factor, bandwidth growth of a certain rate could be incorporated by the model applications into the bandwidth models. The bandwidth models could be constructed to produce a bandwidth projection based on the growth rate. For instance, for a past time period a bandwidth model might accurately represent the historical dataset. However, for a future time period a growth rate may be assumed. Therefore, the bandwidth model should incorporate a growth rate into the patterns associated with the historical dataset.

It should be understood that each model application could be different. For example, one model application could be a Holt-Winters model application, while another model application could be an exponential model application. Other types of model applications are possible. Model applications are available from model application vendors. SAS is an example of a vendor. Each different model application could therefore process the historical datasets differently and generate different bandwidth models.

It should be further understood that each model application could generate multiple bandwidth models by processing the historical dataset differently for each bandwidth model. For example, a first model application could weight a historical dataset to generate a first bandwidth model. The first model application could then weight the historical dataset differently in order to generate a second bandwidth model. The first and second bandwidth models would differ as result of the different weightings.

After generating the various bandwidth models, the bandwidth projection system selects one of the bandwidth models from the multiple bandwidth models based on a comparison to the historical dataset (Step 303). The bandwidth projection system could perform the comparison between the historical dataset and each of the bandwidth models. In one example, the selected bandwidth model could be the bandwidth model that has the best fit with the historical dataset. A root-mean squared error function is one technique to determine a best fit. Other comparisons are possible.

Once selected, the bandwidth projection system generates the bandwidth projection using the selected bandwidth model (Step 304). The bandwidth projection could indicate a projected bandwidth usage by the customer during a future time period. The bandwidth projection system could then transfer the bandwidth projection to the customer (Step 305). The bandwidth projection could be transferred to the customer over a communication network to a customer device.

Figure 4:
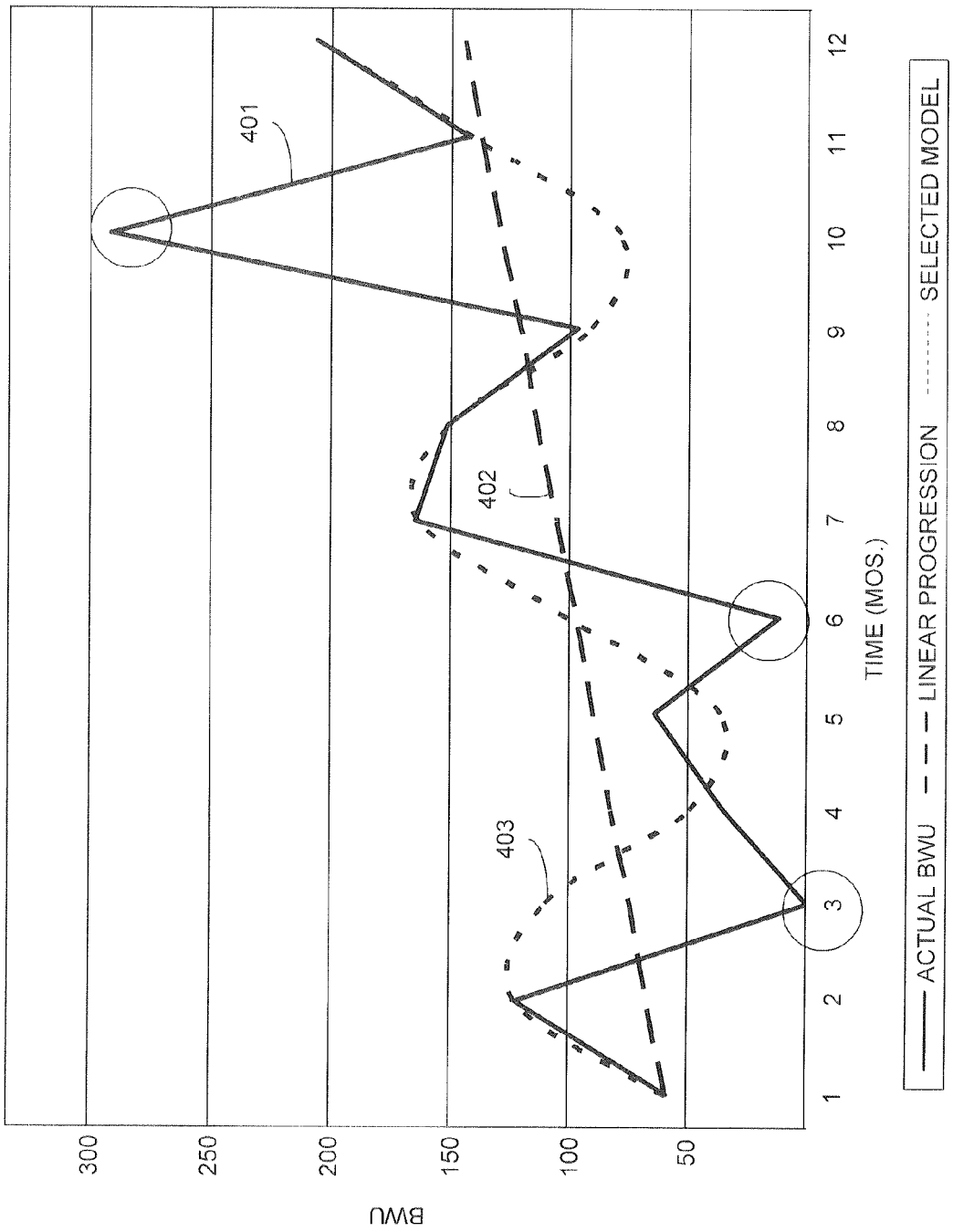
FIG. 4 illustrates a graph in an embodiment of the invention.

FIG. 4 illustrates a graph of a historical dataset 401, a linear bandwidth model 402 in an example of the prior art, and a bandwidth model 403 in an embodiment of the invention.

As discussed in the background, linear models are not accurate bandwidth models because most bandwidth usage patterns include peaks and troughs, whereas linear models, when graphed, follow a straight line. FIG. 4 illustrates how, when compared to a historical bandwidth dataset 401, a graph of a linear bandwidth model 402 does not closely resemble the historical bandwidth dataset 401. FIG. 4 further illustrates how process 300 illustrated in FIG. 3 produces an improved bandwidth model 403 over the prior art.

Referring to FIG. 4, the vertical axis of the graph indicates bandwidth usage. The horizontal axis of the graph indicates a twelve month time period. The historical dataset is the historical dataset illustrated in FIG. 1. The linear model 402 is based on the historical dataset. The bandwidth model 403 is also based on the historical dataset 401. It should be understood that a bandwidth projection system executing the process 300 of FIG. 3 could generate the bandwidth model 403 exemplified in FIG. 4.

As illustrated in FIG. 4, the historical dataset 401 contains several peaks and troughs. For example, peaks occur on the graph of the historical dataset 401 at 2 months, 5 months, 7 months, 8 months, and 10 months. Troughs occur on the graph at 3 months, 6 months, 9 months, and 11 months.

As further illustrated in FIG. 4 the graph of the linear bandwidth model 402 is a straight line and does not closely resemble or track the actual bandwidth displayed by the historical dataset 401. For example, the peaks and troughs of the historical dataset 401 are not approximated by the linear bandwidth model. During some periods, such as during months 1-2 and 7-8, the bandwidth indicated by the linear model 402 is much less than the actual bandwidth indicated in the historical dataset 401. During other periods, such as during months 3-6 and month 9, the bandwidth indicated by the linear bandwidth model 402 is much greater than the actual bandwidth indicated in the historical dataset 401. In addition, the non-linear model 403 at month 10 projects a bandwidth usage lower than the linear model 402 because the non-linear model 403 corrected for the outlier at month 10. In contrast, the linear model 402 did not correct the outlier at month 10.

When developed into a linear bandwidth projection, the linear model used to create graph 402 will produce data that does not track the likely future bandwidth need of the customer. Rather, a graph of the linear bandwidth projection would follow a straight line and would not resemble the likely peaks and troughs of actual bandwidth need. During times of greater bandwidth need, the bandwidth delivered based on the erroneous projection would likely fall short of the need. During times of less bandwidth need, the bandwidth delivered based on the erroneous projection would likely exceed the need.

In contrast to the prior art, the bandwidth model 403 in an embodiment of the invention closely tracks the historical dataset 401. For example, the bandwidth model 403 contains peaks and troughs that resemble the peaks and troughs of the historical dataset 401. It should be understood that the bandwidth model 403 could be a non-linear model, such as a sinusoidal model.

In particular, during some periods, such as during months 1-2 and 7-8, the bandwidth model 403 closely matches the actual bandwidth represented by the historical dataset 401. For instance, the peak that occurs at month two in the historical dataset 401 is closely matched by a peak in the bandwidth model 403. In contrast, the linear bandwidth model 402 contains no such peak.

During other periods, such as during months 3-6 and month 9, the bandwidth model 403 closely resembles the actual bandwidth of the historical dataset 401. For instance, the trough that occurs at month 9 in the historical dataset 401 is closely matched by a trough in the bandwidth model 403.

A bandwidth projection generated based on the bandwidth model illustrated by graph 403 could more closely meet the actual future bandwidth needs of a customer than a projection generated by a linear bandwidth model in the prior art.

Figure 5:
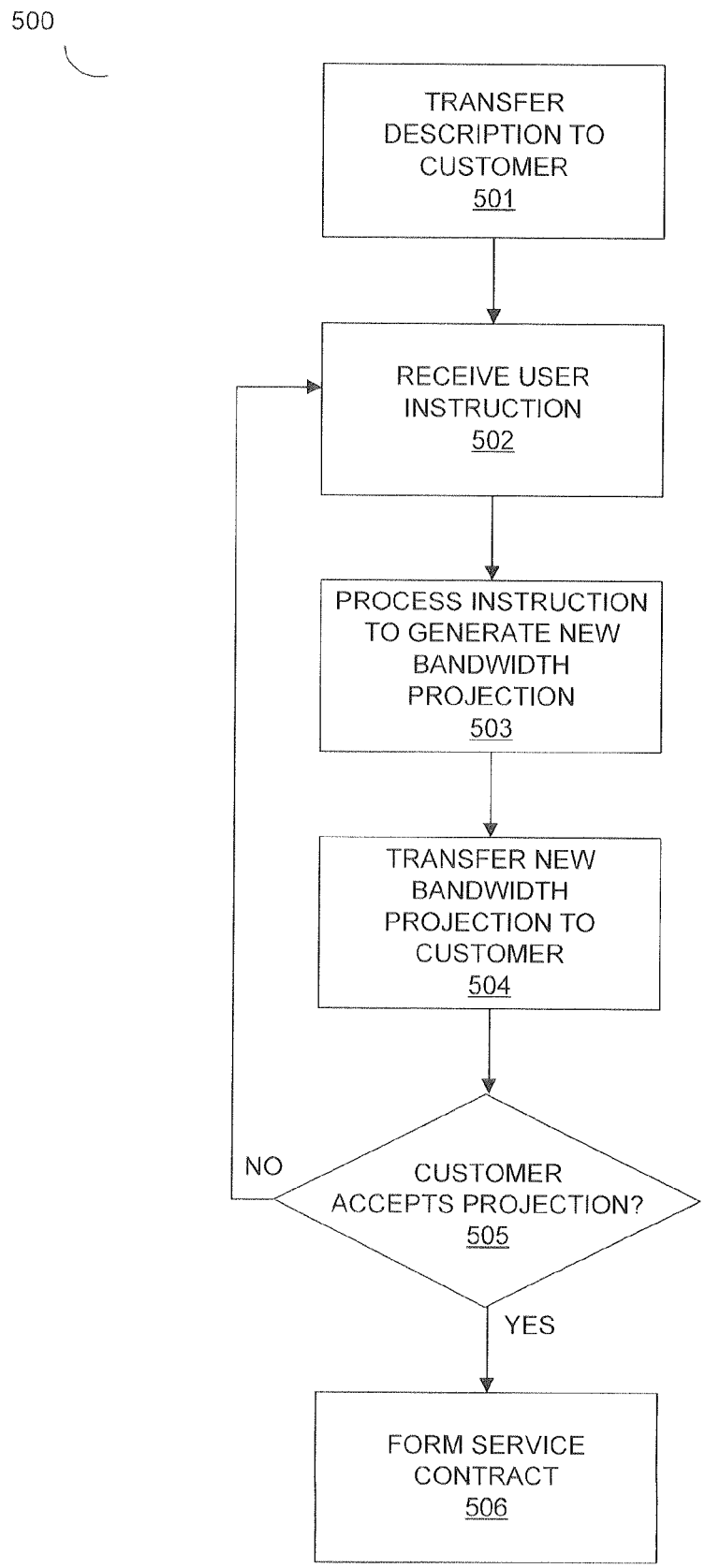
FIG. 5 illustrates a process in an embodiment of the invention.

FIG. 5 illustrates a process 500 in an embodiment of the invention. The process 500 could be employed by a bandwidth projection system to generate a service contract.

Referring to FIG. 5, the bandwidth projection system transfers a model description associated with a bandwidth projection to a customer (Step 501). It should be understood that the bandwidth projection could be generated by the process 300 illustrated in FIG. 3.

The bandwidth projection could have an associated bandwidth model that generated the bandwidth projection. In addition, the bandwidth projection could have an associated model application that generated the associated bandwidth model. The model description could describe the model application used to generate the bandwidth model, the bandwidth model that generated the bandwidth projection, or both.

The bandwidth projection and model description could be transferred automatically to a communication portal, such as a web site, an email server, or the like. The customer could receive the bandwidth projection and responsively generate and return a user instruction. For instance, the user instruction could be related to the bandwidth model, the model application, or both.

The user instruction could indicate factors used by either the model application to generate the bandwidth model or used by the bandwidth model to generate the bandwidth projection, or both. Examples of factors include, but are not limited to, a growth factor, a chronological factor, or a seasonal factor. Other factors are possible.

The bandwidth system receives the user instructions (Step 502). The bandwidth system then processes the user instructions to generate a new bandwidth projection using the user instructions (Step 503). For example, the initial bandwidth projection could have been generated using an initial growth factor. The user instruction could include a new growth factor that is different than the initial growth factor. A new bandwidth projection could be generated using the new growth factor.

In another example, the initial bandwidth projection could have been generated using an initial chronological factor. The user instruction could include a new chronological factor that is different than the initial chronological factor. A new bandwidth projection could be generated using the new chronological factor.

In another example, the initial bandwidth projection could have been generated using an initial seasonal factor. The user instruction could include a new seasonal factor that is different than the initial seasonal factor. A new bandwidth projection could be generated using the new seasonal factor.

After generating the new bandwidth instruction, the bandwidth projection system transfers the new bandwidth projection to the customer (Step 504). The customer could either respond with an acceptance of the new bandwidth projection or rejection the new bandwidth projection (Step 505).

In one example, the bandwidth projection could be presented to the customer via an interface in the form of a proposal for a service contract. The interface could give the customer the option to accept or reject the proposed service contract. In a service contract, the service provider could guarantee specific allocations of bandwidth to a customer during the term of the service contract. A service level agreement (SLA) is an example of a service contract.

If the customer accepts the new bandwidth projection, the acceptance could form a service contract between the service provider and the customer for the bandwidth amount indicated by the new bandwidth projection for a future period of time (Step 506). During the future time period, the service provider could be required by the service contract to provide to the customer the amount of bandwidth indicated by the new bandwidth projection.

If the customer does not accept the new bandwidth projection, the customer could return a new user instruction. In such a case, the process returns to Step 502.

Possible implementations of the transfer, presentation, and acceptance functionality include dedicated systems at the customer site, or a site that the customer shares with another entity. Alternatively, the bandwidth projection system could transfer the bandwidth projection to a web platform, accessible from a customer device. The bandwidth projection and acceptance functionality could be implemented on the web platform.

Figure 6:
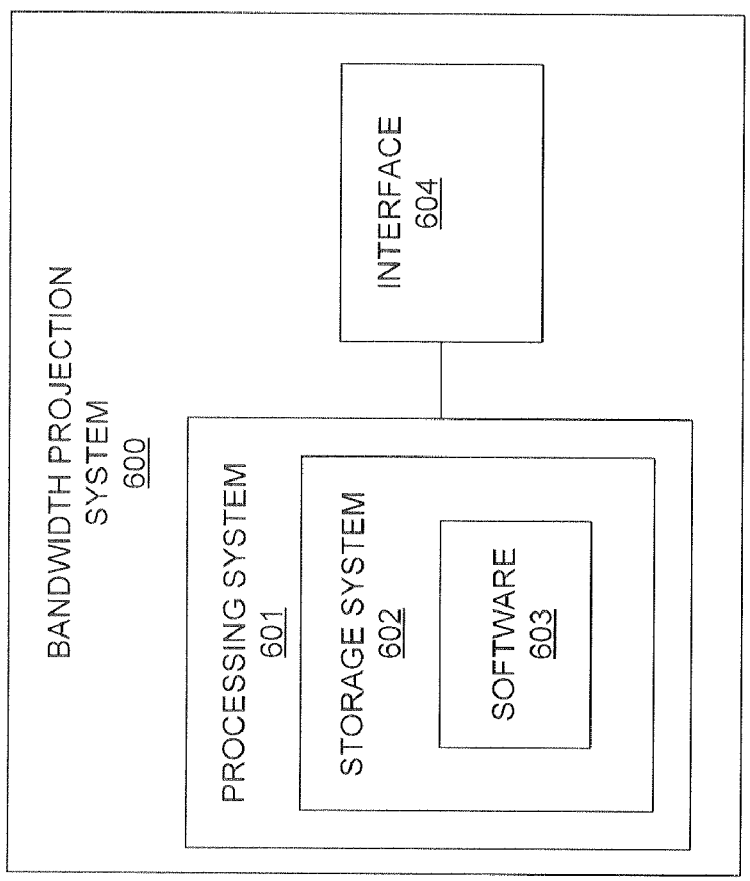
FIG. 6 illustrates a bandwidth projection system in an embodiment of the invention.

FIG. 6 illustrates bandwidth projection system 600 in an embodiment of the invention. Bandwidth projection system 600 includes processing system 601, storage system 602, software 603, and interface 604. Processing system 601 is linked to storage system 602 and interface 604. Storage system 602 stores software 603. Bandwidth projection system 600 could comprise a programmed general-purpose computer, although those skilled in the art will appreciate that programmable or special purpose circuitry and equipment may be used. Bandwidth projection system 600 may use a distributed architecture such that various devices together comprise elements 601-604.

Processing system 601 could comprise a computer microprocessor, logic circuit, or some other processing device. Processing system 601 could be distributed among multiple processing devices.

Storage system 602 could comprise a disk, tape, integrated circuit, server, volatile or non-volatile memory, or some other memory device. Storage system 602 may be distributed among multiple memory devices.

Interface 604 could comprise a network interface card, modem, port, or some other communication device. Interface 604 may be distributed among multiple communication devices.

Processing system 601 retrieves and executes software 603 from storage system 602. Software 603 may comprise an operating system, utilities, drivers, networking software, an application program, firmware, or some other form of machine-readable processing instructions. Software 603 may be distributed among multiple implementations of machine-readable processing instructions. When executed by the processing system 601, software 603 directs processing system 601 to operate as described herein for a bandwidth projection system.

In an advantage, a bandwidth projection system as described herein could execute multiple model applications to generate bandwidth models. A greater variety of bandwidth models results from utilizing multiple model applications to generate bandwidth models, as opposed to using a single model application as in the prior art. The ability of a service provider to select a bandwidth model that closely resembles the historical dataset usage of a customer is improved by having a variety of bandwidth models from which to select a best fit or preferred bandwidth model.

In another advantage, a bandwidth projection system as described herein could generate non-linear bandwidth models. Historical dataset based on customer bandwidth usage can be modeled more closely by non-linear bandwidth models than by linear bandwidth models. In addition, the bandwidth projections generated by the non-linear bandwidth models are more accurate than the bandwidth projections generated by linear bandwidth models.

Many businesses have bandwidth needs that follow non-linear patterns. For instance, accounting firms generally require more bandwidth during tax season than during other times of the year. Non-linear bandwidth models can model the bandwidth needs of an accounting firm more reliably than linear bandwidth models. For example, a non-linear bandwidth model could capture peak bandwidth usage periods (tax season) and the troughs (other seasons). In contrast, linear bandwidth models are not able to capture bandwidth patterns having peaks and troughs. A bandwidth projection for the accounting firm generated by a non-linear bandwidth model will be more accurate than a bandwidth projection generated by a linear bandwidth model. As a result, the accounting firm will enjoy sufficient bandwidth during tax season. During other seasons, the bandwidth provided to the accounting firm will be reduced based on the improved bandwidth projection.

A bandwidth projection system as described herein could be used in various communication environments. For example, the bandwidth projection system could be used to size a T-1 link based on historical erlang data. In another example, the bandwidth projection system could be used to project bits per second requirements on an Internet protocol link based on historical bandwidth data. In yet another example, the bandwidth projection system could be used to size the capacity of a wireless communication link based on historical signal strength and bandwidth data.

Those skilled in the art will appreciate that the features described above can be combined in various ways to form multiple embodiments of the invention. As a result, the invention is not limited to the specific embodiments described above, but only by the claims and their equivalents.

The invention claimed is:

1. A method of operating a bandwidth projection system, the method comprising:

receiving a historical dataset associated with a customer, wherein the historical dataset indicates bandwidth usage during a historical time period;

processing the historical dataset with a plurality of model applications to generate a plurality of bandwidth models based on the historical dataset;

selecting a one model from the plurality of models based on a comparison to the historical dataset;

generating a bandwidth projection using the one model wherein the bandwidth projection indicates a bandwidth usage during a future time period; and transferring the bandwidth projection to the customer.

2. The method of claim 1 further comprising transferring a description of the one model to the customer.

3. The method of claim 2 further comprising receiving a user instruction related to the one model, the user instruction being transferred from the customer in response to receiving the description of the one model.

4. The method of claim 3 further comprising processing the user instruction to generate a new bandwidth projection and transferring the new bandwidth projection to the customer.

5. The method of claim 4 further comprising receiving an acceptance from the customer wherein the acceptance forms a service contract between a service provider and the customer for the new bandwidth projection during the future time period.

6. The method of claim 3 wherein the description of the one model includes a growth factor.

7. The method of claim 6 wherein the user instruction includes a different growth factor.

8. The method of claim 3 wherein the description of the one model includes a chronological factor.

9. The method of claim 8 wherein the user instruction includes a different chronological factor.

10. The method of claim 1 wherein the plurality of bandwidth models comprise non-linear bandwidth models.

11. The method of claim 1 further comprising selecting the one model using a root mean square error formula.

12. The method of claim 1 wherein a first model application of the plurality of model applications comprises a Holt-Winters model application.

13. The method of claim 12 wherein a second model application of the plurality of model applications comprises an exponential model application.

14. A software product for operating a bandwidth projection system, the software product comprising:

software operational when executed by the bandwidth projection system to direct the bandwidth projection system to receive a historical dataset associated with a customer wherein the historical dataset indicates bandwidth usage during a historical time period, process the historical dataset with a plurality of model applications to generate a plurality of bandwidth models based on the historical dataset, select a one model from the plurality of models based on a comparison to the historical dataset, generate a bandwidth projection using the one model wherein the bandwidth projection indicates a bandwidth usage during a future time period, and transfer the bandwidth projection to the customer; and a storage medium storing the software.

15. The software product of claim 14 wherein the software is further operational when executed by the bandwidth projection system to direct the bandwidth projection system to transfer a description of the one model to the customer.

16. The software product of claim 15 wherein the software is further operational when executed by the bandwidth projection system to direct the bandwidth projection system to receive a user instruction related to the one model, the user instruction being transferred from the customer in response to receiving the description of the one model.

17. The software product of claim 16 wherein the software is further operational when executed by the bandwidth projection system to direct the bandwidth projection system to process the user instruction to generate a new bandwidth projection and transfer the new bandwidth projection to the customer.

18. The software product of claim 17 wherein the software is further operational when executed by the bandwidth projection system to direct the bandwidth projection system to receive an acceptance from the customer wherein the acceptance forms a service contract between a service provider and the customer for the new bandwidth projection during the future time period.

19. The software product of claim 16 wherein the description of the one model includes a growth factor.

20. The software product of claim 19 wherein the user instruction includes a different growth factor.

21. The software product of claim 16 wherein the description of the one model includes a chronological factor.

22. The software product of claim 21 wherein the user instruction includes a different chronological factor.

23. The software product of claim 14 wherein the plurality of bandwidth models comprise non-linear bandwidth models.

24. The software product of claim 14 further comprising selecting the one model using a root mean square error formula.

25. The software product of claim 14 wherein a first model application of the plurality of model applications comprises a Holt-Winters model application.

26. The software product of claim 25 wherein a second model application of the plurality of model applications comprises an exponential model application.

* * * * *